June 22, 1937.   J. G. GUERTIN   2,084,615
GARAGE DOOR
Filed March 24, 1936   6 Sheets-Sheet 1
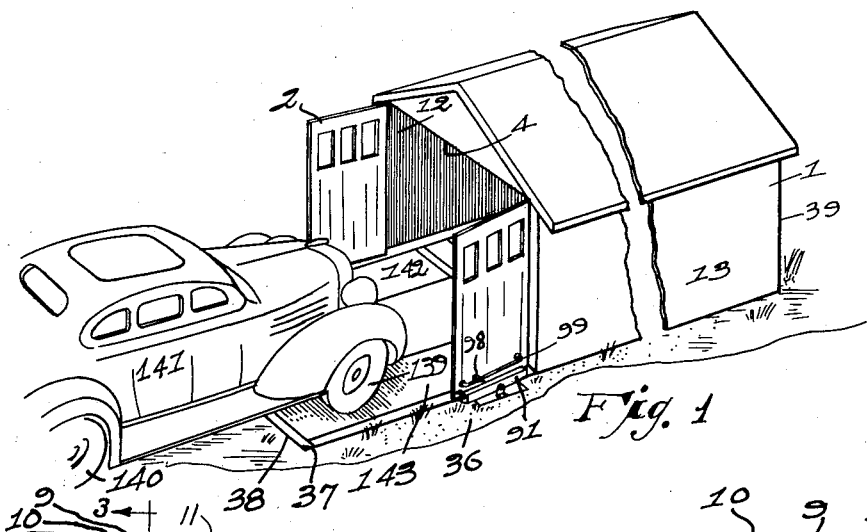
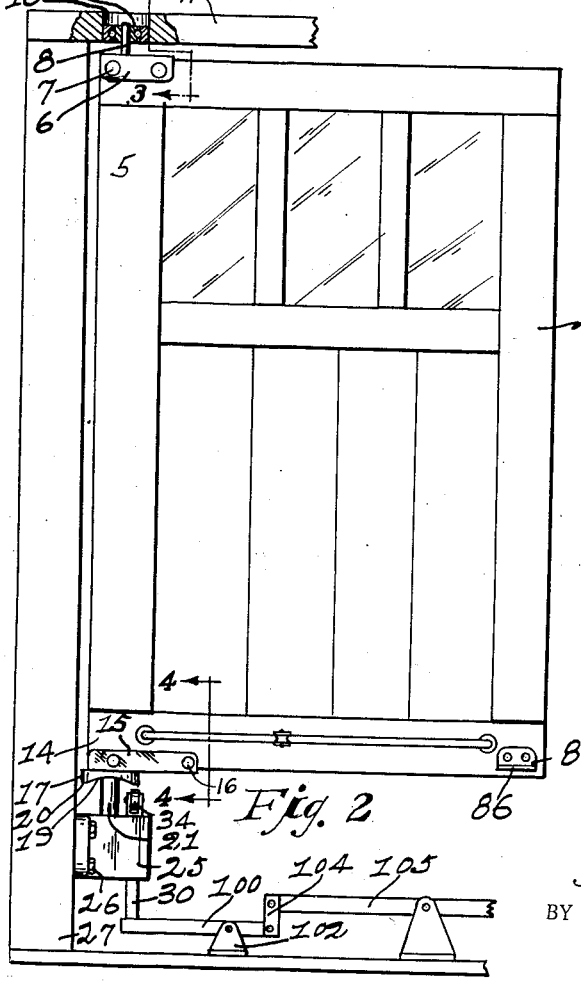
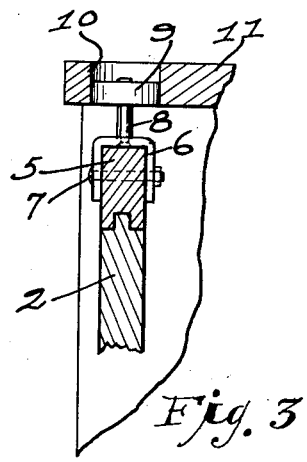
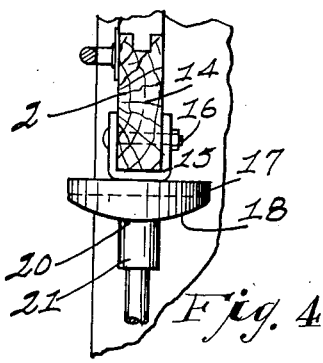
INVENTOR.
JOSEPH GILLES GUERTIN
BY
Leo. *Danker*
ATTORNEY.

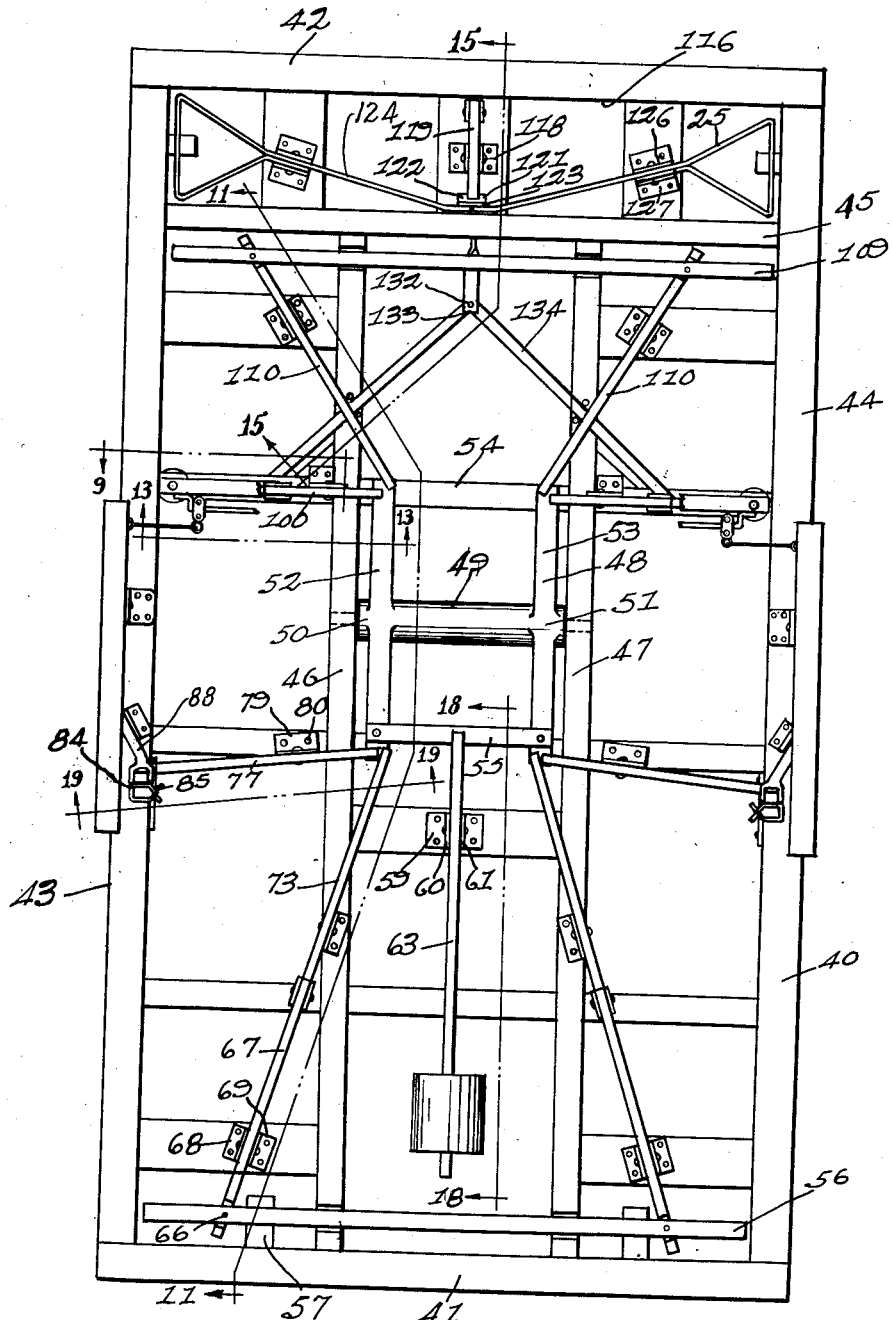

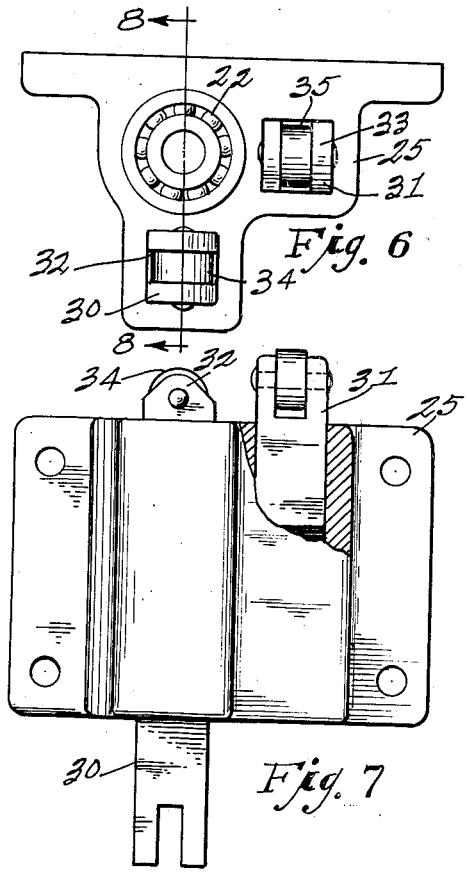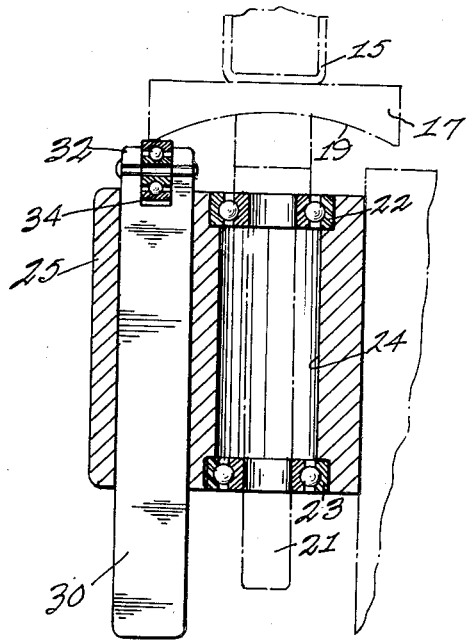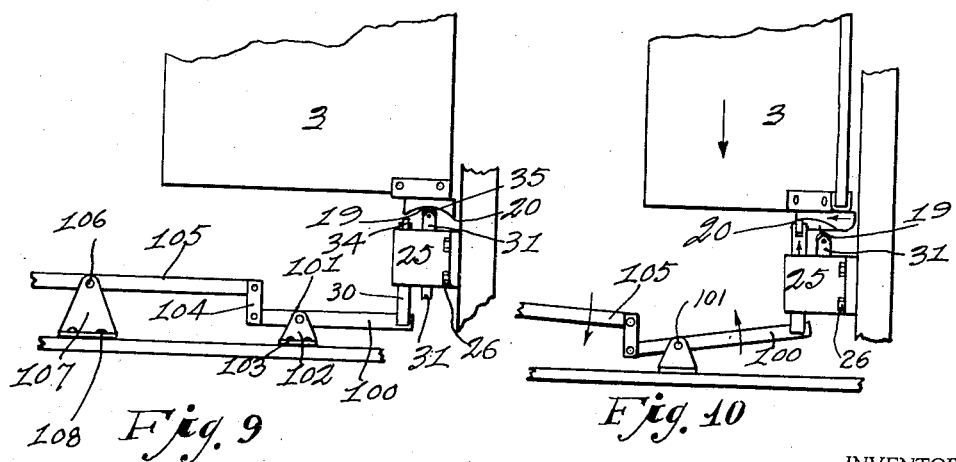

June 22, 1937.  J. G. GUERTIN  2,084,615
GARAGE DOOR
Filed March 24, 1936  6 Sheets-Sheet 4
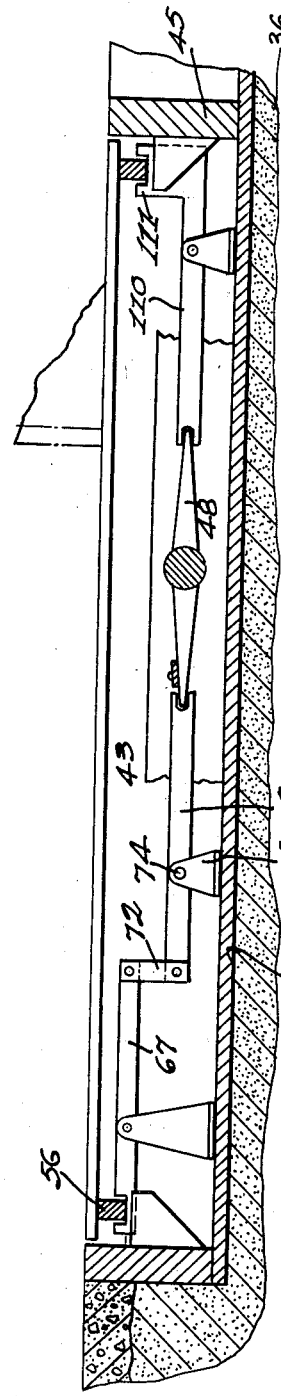
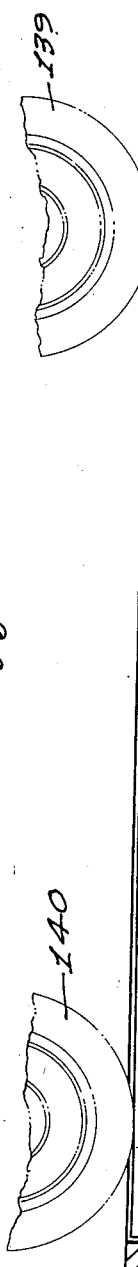
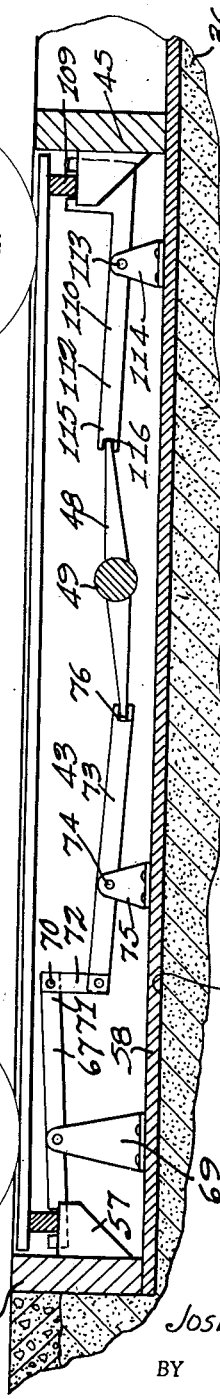
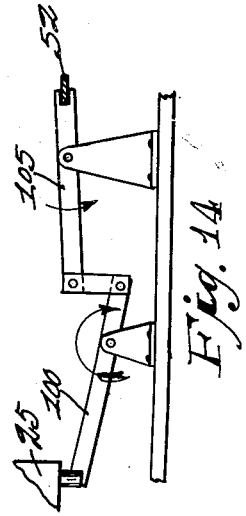
INVENTOR.
JOSEPH GILLES GUERTIN
BY
ATTORNEY.

June 22, 1937.  J. G. GUERTIN  2,084,615
GARAGE DOOR
Filed March 24, 1936  6 Sheets-Sheet 5

INVENTOR.
JOSEPH GILLES GUERTIN
BY
ATTORNEY.

INVENTOR.
JOSEPH GILLES GUERTIN
BY
ATTORNEY.

Patented June 22, 1937

2,084,615

UNITED STATES PATENT OFFICE 2,084,615

GARAGE DOOR

Joseph Gilles Guertin, Amelia, Ohio

Application March 24, 1936, Serial No. 70,640

2 Claims. (Cl. 268—35)

The invention relates to a garage, particularly, but not exclusively, or other structure having doors, gates, and the like, adapted to be automatically opened and closed by contact of the wheels of an automobile.

Heretofore, considerable difficulty and inconvenience has been experienced by automobile drivers who are compelled to get out of their automobiles and open garage doors and then close said doors after the automobile has been driven therein.

Therefore, the objects of the inventor are to provide means adapted to automatically open and close garage doors, said means being operated by weight of the automobile as it is being driven toward and into said garage; to provide means to automatically lock said means ordinarily operated by said wheels outside the garage, after said automobile has been driven into said garage; and to provide auxiliary means to assist the door opening mechanism to open said garage doors.

Other objects of the invention will be apparent by reference to the hereinafter description and to the drawings.

The invention comprises features and combination of parts, as will be hereinafter set forth, shown in the drawings and claimed.

In the drawings:

Fig. 1 is a perspective view of a garage having the invention incorporated therein;

Fig. 2 is an elevational view of the front of the garage, with parts removed and with parts broken away;

Fig. 3 is a section taken on the line 3—3 in Fig. 2, with parts broken away;

Fig. 4 is a section taken on the line 4—4 in Fig. 2, with parts broken away;

Fig. 5 is a plan view of the cavity and mechanism therein;

Fig. 6 is a plan view of the housing;

Fig. 7 is a side elevational view of the same with parts broken away;

Fig. 8 is a section taken on the line 8—8 in Fig. 6;

Fig. 9 is a side elevational view of the door opening and closing mechanism taken on line 9—9 in Fig. 5, and with parts broken away;

Fig. 10 is the same with the mechanism in different positions;

Fig. 11 is a section taken on the line 11—11 in Fig. 5, with parts removed and with parts broken away;

Fig. 12 is the same showing the mechanism in different positions;

Fig. 13 is a side elevational view of the door opening mechanism taken on line 13—13 in Fig. 5, with parts removed and with parts broken away;

Fig. 14 is the same showing the mechanism in different positions;

Figure 15:
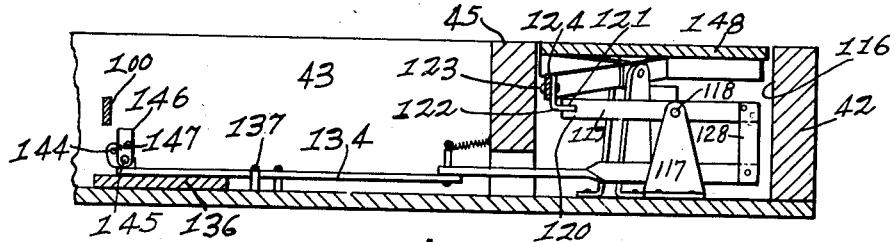
Fig. 15 is a section taken on the line 15—15 in Fig. 5, with parts removed and with parts broken away.

In the preferred construction of the invention, I provide the garage 1 having the doors 2 and 3 for the purpose of closing the doorway 4.

As shown in Figs. 2 and 3 each door has fixed to its upper edge 5 the U-shape bracket 6 having the bolts 7 received through holes therein and through the upper edge of the door.

Integrally connected with the bracket 6 is the vertical pin 8 whose upper end is rotatably mounted in the annular ball bearing 9 suitably fixed in the recess 10 in the plate 11 which extends from the side wall 12 to the side wall 13 of the garage.

The top of the bracket 6 is spaced from the plate 11 whereby the door may be elevated from the position shown in Figs. 2 and 3, for purposes hereinafter fully explained.

As shown in Figs. 2 and 4, fixed to the outer bottom edge 14 of each door is the U-shape bracket 15 having the bolts 16 received through holes therein, and the bolts also are received through the bottom of the door.

Suitably fixed to the bottom of the bracket 15 is the cam 17 having in its lower side 18 the curved grooves 19 and the curved obtrusions 20. Formed integrally with the lower side 18 of the cam 17, and centrally disposed thereof, is the downwardly extending vertical pin 21 having its lower end rotatably mounted in the bearings 22 and 23 received in the hole 24 in the housing 25 which is fixed, as by the bolts 26, to the side frame 27 of the garage 1.

Slidably mounted in the bearing or holes 28 and 29 in the housing 25 are the vertical push rods 30 and 31 having the forks 32 and 33 formed in their upper ends in which are rotatably mounted the ball rollers 34 and 35 each being positioned in alignment with the outer edge of the cam 17, whereby when the rods 30 and 31, as hereinafter explained, move upwardly the rollers contact the lower side of the cam.

In the ground 36 is the cavity 37 which extends from the point 38 in front of the garage to the rear wall 39 of the garage and from the side wall 12 to the side wall 13.

The frame 40, comprising the front and rear walls 41 and 42 and the side walls 43 and 44, is positioned in the cavity 37. Spaced from the rear wall 42 is the horizontal partition 45 which extends from the side wall 43 to the side wall 44. Extending from the partition 45 to the front wall 41 are the parallel and spaced apart supports 46 and 47 spaced equi-distant from the side walls 43 and 44.

Pivotally mounted in the supports 46 and 47, and centrally disposed of the cavity 37, is the rocker frame 48 which comprises the shaft 49 having its ends 50 and 51 pivotally mounted in the supports 46 and 47. The spaced apart and parallel plates 52 and 53, integrally formed with the ends of the shaft 49, extend at right angles thereto, and the end plates 54 and 55 are suitably fixed to the ends of the plates 52 and 53.

Spaced from the front wall 41 and extending parallel thereto, is the horizontal bar 56 whose downward movement is limited by the spaced apart blocks 57 fixed to the front wall 41 and extending inwardly thereof.

Fixed to the floor 58 of the cavity 37 is the bracket 59 having the spaced apart upwardly extending arms 60 and 61 having holes therein in which is received the pin 62 on which the lever 63 is pivoted. On the front end of the lever 63 is the weight 64, which is slidable on the lever and which may be fixed in a predetermined position on the lever as by the set bolt 65. In the rear end of the lever 63 is the notch 66 into which is received the plate 55. The weight 64 is manually adjusted on the lever 63 so that the rocker frame 48 shall be retained in horizontal position when the various mechanism herein previously and after explained are in inoperative positions.

Fixed to each end of the bar 56, as by the pin 66, is the front end of the horizontal lever 67 which is pivoted to the spaced apart arms 68 and 69 fixed to the floor 58. Pivoted, as by the pin 70, to the rear end 71 of the lever 67 is the upper end of the vertical rod 72 having its lower end pivoted to the horizontal lever 73 which is pivoted on the pin 74 which is rotatably received in a hole in the vertical arm 75 fixed to the floor 58.

Formed in the inner end of the lever 73 is the notch 76 which receives the front end of the plate 52, whereby downward movement of the bar causes the rear end of the lever 73 to move downwardly thereby causing the front end of the frame to move downwardly to the position shown in Fig. 12.

The lever 77 is pivotally mounted on the pin 78 which is received in the upwardly extending bracket 79 fixed as by the bolts 80, to the floor 58. The lever has the notch 81 in its inner end 82 and the notch receives the rear end of the plate 52 whereby, when the front end of the frame 48 moves downwardly, the outer end of the lever 77 moves upwardly.

Fixed to the outer end of the lever 77 is the vertical rod 83 having fixed to its upper end the spring catch 84 having the yieldable jaws 85. The outer edge 86 of the L-shape male member 87, fixed to the outer lower edges of the doors 2 and 3, is adapted to be received between the jaws, when the doors 2 and 3 are open, to retain the doors in open position.

The rod 83 is slidable beneath the plate 83' fixed to the side wall 43.

Fixed to the catch 84 is the arm 88 which is pivoted to the vertical arm 89 which is fixed to the top of the side wall 43. The other end of the lever 88 is pivoted to the arm 90 which extends downwardly from the trough 91. Fixed to the bottom of the trough 91 is the projection 92 pivoted to the vertical arm 93 fixed to the top of the side wall 43.

In the trough 91 is the roller 94 having the integrally formed eye-bolt 95 extending outwardly through the slot 96 in the trough. Fixed in the eye of the eye-bolt 95 is the end of the connecter 97 having its other end connected with the roller or slide 98 slidable on the horizontal rod 99 fixed to the lower edge of the doors 2 and 3.

Pivoted to the lower end of the rod 30 is the horizontal lever 100 which is pivoted on the pin 101 which is received in the upper end of the vertical arm 102 which is fixed, as by the bolts 103, to the floor 58. Pivoted to the outer end of the lever 100 is the lower end of the vertical rod 104 having its upper end pivoted to the inner end of the lever 105 pivotally mounted on the pin 106 received in the upper end of the vertical arm 107 which is fixed, as by the bolts 108, to the floor 58. The outer end of the lever 105 has the notch 106 therein in which is received the rear end of the plate 52, whereby when the bar 56 is depressed and the rear end of the frame 48 moves to the upward position shown in Fig. 12 the outer end of the lever 105 is caused to move upwardly from the position shown in Figs. 9 and 13 to the position shown in Figs. 10 and 14 thereby forcing the rod 30 upwardly and causing the roller 34 to engage the obtrusion 20 on the lower surface of the cam which raises the door so that the space, shown in Figs. 2 and 3, between the bracket 6 and the plate 11 is eliminated and the bracket 6 contacts the plate 11. Upward force of the roller 34 on the obtrusion 20 causes the cam to roll on the roller from the position shown in Fig. 9 to the position shown in Fig. 10 thereby causing the doors 2 and 3 to move from the closed positions shown in Fig. 5 to the open positions shown in Fig. 7.

Spaced from the rear wall 42 is the bar 109 having pivoted to its ends the rear ends of the levers 110 whose rear ends 111 extend at an angle to the main bodies 112 of the levers and each have the notch 113 therein which receives the bar 109. The body 112 is pivoted on the pin 113 which is received in the upper end of the arm 114 fixed to the floor 58 of the cavity. The front end 115 of the lever 110 has the notch 116 therein in which is received the rear end of the plate 52. During the period when the bar 109 is in the depressed position shown in Fig. 12, or at periods when the bar 109 is manually depressed the rear end of the frame 48 is elevated thereby causing the mechanism in Figs. 9 and 13 to assume the positions shown in Fig. 10 and Fig. 14 whereby the front end of the lever 100 forces the rod 30 upwardly causing the roller 34 to engage the obtrusions 20 on the lower surface of the cam 17 thereby rotating the cams 17 and opening the doors of the garage.

In the space 116, which is between the rear wall 42 and the partition or support 45, is the vertical bracket 117 fixed to the floor 58. The bracket 117 has the pin 118 in its upper end on which is pivotally mounted the lever 119 having the notch 120 in its front end and in which is received the horizontal leg 121 of the L-shape member 122 having its vertical leg 123 fixed to the rear surface of the bent bar 124 having its ends bent to form loops 125 and having its body portion slidably mounted between the vertical legs 126 of the L-shape members 127 fixed to the floor 58.

Figure 16:
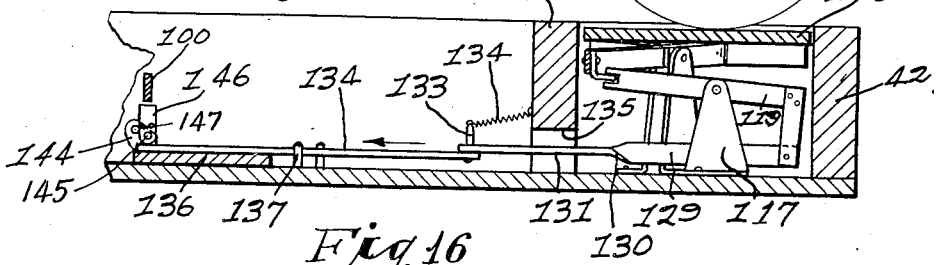
Fig. 16 is the same and showing the mechanism in different positions.
Figure 18:
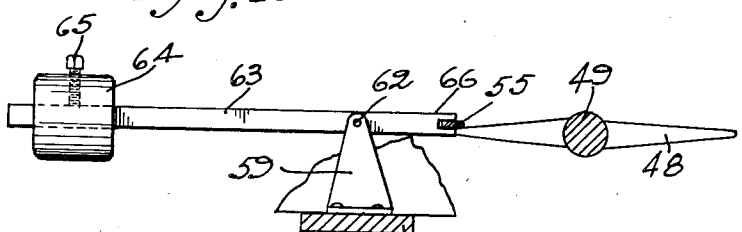
Fig. 18 is a view taken on the line 18—18 in Fig. 5, with parts removed and with parts broken away.
Figure 19:
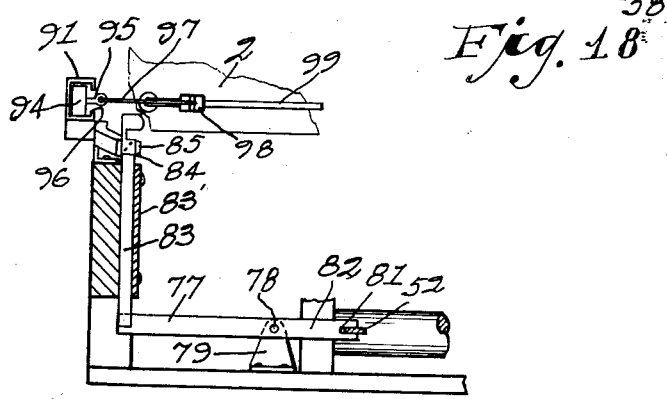
Fig. 19 is a section taken on the line 19—19 in Fig. 5, with parts removed and parts broken away.
Figure 20:
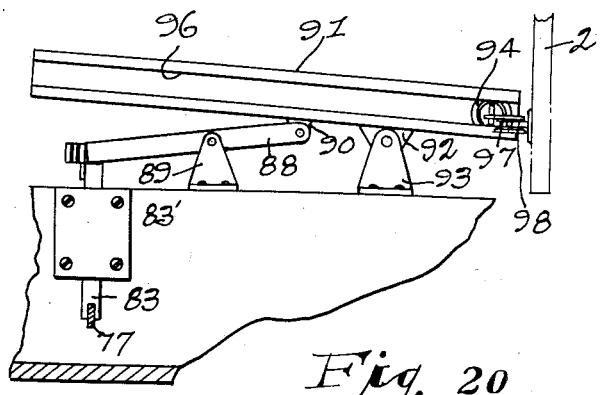
Fig. 20 is a side elevational view of the trough and associated mechanism and with parts broken away.
Figure 22:
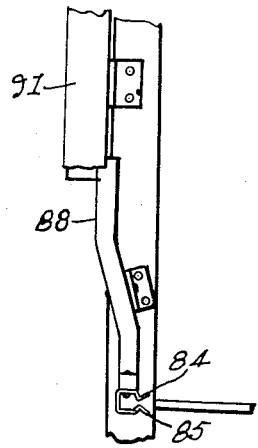
Fig. 22 is a plan view of the same.

Fixed to the rear end of the lever 119 is the upper end of the rod 128 having its lower end pivoted to the rear end of the bar 129 which is twisted at 130 so that its front end 131 shall be horizontal. The front end has the hole 132 therein in which is received the vertical post 133 which is fixed, as shown in Figs. 5, 15 and 16, to the rear ends of the horizontal rods 134 which extend forwardly and outwardly of the cavity 37. The bar 129 extends from the space 116 through the aperture 135 in the partition 45 whereby downward movement of the bar 124 causes downward movement of the front end of the lever 119 and through the rod 128 the bar 129 is moved forwardly and outwardly. Each rod slides on the support 136 and between the spaced apart pins 137 fixed in the floor. Fixed to the top of the post 133 is the coiled spring 138 which is fixed to the front side of the partition 45, whereby when no downward pressure is being exerted on the bar 124 the spring 138 urges the rods 134, bar 129, and other mechanism shown in Figs. 15 and 16, to the positions shown in Fig. 15.

When the front and rear wheels 139 and 140, or both of the automobile 141 roll onto the runways 142 the bar 56 first is forced downwardly which, through mechanism previously explained partly comprising the levers 67, and 73, frame 48, levers 105 and 100, and rod 30, causes the roller 34 to engage the obtrusion 20, closing the spaces between the brackets 6 and the plate 11, and the position shown in Figs. 2 and 9, and the cam is caused to rotate thereby causing the doors 2 and 3 to partly open to the position shown in Fig. 10 and to the full position. After the wheels 139 and 140 have passed to the rear of the runways 142 the doors 2 and 3 drop by gravitation and the obtrusions 20 contact the rollers 35 of the push rods 31 and the doors 2 and 3 are caused to move from open position to closed position since, when the rollers 35 are contacted by the obtrusions 20 the weight of the doors causes the doors to move to permit the rollers 35 to be positioned in contact with the grooves 19, as shown in Fig. 9.

Connected with the front ends of the rods 134 are the upwardly projecting ears 144 having pivoted thereto, as by the pins 145, the vertical posts 146. Each spring 147, having its ends fixed to the ear 144 and the post 146, urge the post to the vertical position shown in Figs. 15 and 16.

When the automobile 144 has passed inwardly of the garage 1 and from the runways 142 and 143 onto the board 148, which rests upon the bar 124, downward pressure is exerted on the bar 124 and the rods 134 are forced outwardly and forwardly. The vertical posts 146, connected with their front ends, are forced beneath the inner ends of the horizontal rods 100, and when the roller 34, levers 100 and 105 and rod 30 are in the position shown in Fig. 13, at which time the frame 48 is in the position shown in Fig. 11. While the posts 146 are beneath the levers 100 and pressure is exerted downwardly of the bars 56 or 109 the frame cannot operate to the position shown in Fig. 12, because the posts 146 prevent the mechanism to assume the position shown in Fig. 14. Therefore, while the automobile 141 is in the garage 1 and its rear wheels 140 contact the board 148, the mechanism is locked against the doors 2 and 3 being opened by downward pressure being exerted on the runways 142 and 143.

Figure 17:
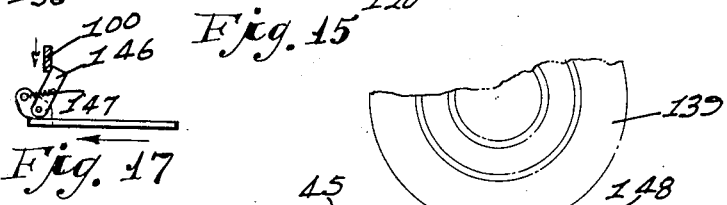
Fig. 17 is a side elevational view of the safety catch and with parts broken away.

When for any reason the mechanism is positioned as shown in Figs. 10 and 14, and the posts 146 cannot be inserted or moved beneath the levers 100, downward pressure on the board 148 or bar 124 causes the rods 134 to move forward and the top of the posts 146 contact the levers 100 and the posts 146 move to the position shown in Fig. 17.

Figure 21:
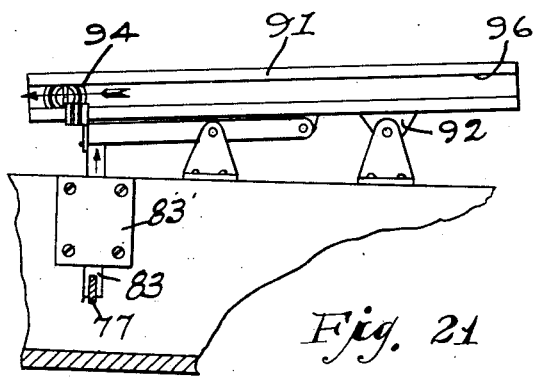
Fig. 21 is the same with the mechanism in different positions.

As previously mentioned when the doors 2 and 3 are closed and downward pressure is exerted on the runways 142 and 143 which, through mechanism previously explained, causes the rollers 34 to engage the obtrusions 20 on the cams and simultaneously the outer end of the lever 77 moves upwardly thereby through the arm 83 and lever 88 the trough 91 assumes the position shown in Fig. 21 whereby the roller 94 rolls in the trough and the slide 98 slides on the rod 99. The connecter 97 prevents a sudden gust of wind from closing the doors 2 and 3 or stopping the continuous opening movement of the doors, caused by the rollers 34 contacting the cams 17, because the connecters 97 prevent closing movement of the doors.

When the doors 2 and 3 are in closed position, the automobile 141 is in the garage and it is desired to drive the automobile from the garage, the operator backs the automobile until the front wheels 139 are removed from the board 148 whereby, through urging of the spring 134, the posts 146 are removed from beneath the levers 100 and weight of the rear wheels 140 forces the bar 109 downwardly thereby operating mechanism previously described which assumes the positions shown in Figs. 10 and 14 whereby the doors 2 and 3 are automatically opened.

The invention may be utilized to automatically open and close doors, gates and the like.

While I believe that the form of the invention illustrated in the drawings and referred to in the above description, as the preferred embodiment, is efficient and practicable, yet realizing that the conditions concurrent with the adoption of the device will necessarily vary, I desire to emphasize the fact that changes in the details may be resorted to, when required, without sacrificing any of the advantages of the invention as defined in the claims. Hence I do not limit myself to the precise details of the materials or the size and shape thereof as set forth, but consider myself at liberty to make such changes and alterations as fairly fall within the spirit and scope of the appended and final claims.

What I claim as new and desire to secure by Letters Patent is:

1. A garage having a platform extending from within said garage to a point in front of its front wall and having a pair of doors mounted on its front wall, said platform adapted to support an automobile, each of said doors being pivotally mounted at its top and bottom, a rotatable cam operatively connected with the lower pivot of each of said doors, and rotation of said cam in one direction being adapted to effect movement of said door and open said door, the front end of said platform being adapted to move downwardly when the front wheels of said automobile are thereon, means operative by the downward movement of the front end of said platform to cause rotation of said cams to effect opening of said doors before said automobile reaches said garage, and means operative by the weight of said automobile, and which prevents operation of said means operative by the downward movement of the front end of said platform, whereby said doors cannot be opened by downward movement of the front end of said platform and auxiliary means to assist opening of said doors when said front end of said platform is forced downwardly before said automobile reaches said garage.

2. A garage having a platform extending from within said garage to a point in front of its front wall and having a pair of doors mounted on its front wall, said platform adapted to support an automobile, each of said doors being pivotally mounted at its top and bottom, a rotatable cam operatively connected with the lower pivot and rotation of said cam in one direction is adapted to effect movement of said door and open said door, the front end of said platform being adapted to move downwardly when the front wheels of said automobile are thereon, means operative by the downward movement of the front end of said platform to cause rotation of said cams to effect opening of said doors before said automobile reaches said garage, and means to assist opening of said doors when said front end of said platform is forced downwardly before said automobile reaches said garage.

JOSEPH GILLES GUERTIN.